United States Patent
Reynolds, Jr.

(10) Patent No.: US 7,243,957 B2
(45) Date of Patent: Jul. 17, 2007

(54) PSEUDO TWO-STEP CONNECTION

(75) Inventor: Harris A. Reynolds, Jr., Houston, TX (US)

(73) Assignee: Hydril Company LP, Houston, TX (US)

( * ) Notice: Subject to any disclaimer, the term of this patent is extended or adjusted under 35 U.S.C. 154(b) by 136 days.

(21) Appl. No.: 11/026,512

(22) Filed: Dec. 30, 2004

(65) Prior Publication Data
US 2006/0145476 A1    Jul. 6, 2006

(51) Int. Cl.
*F16L 25/00* (2006.01)
(52) U.S. Cl. ........................... 285/333; 285/334
(58) Field of Classification Search ............ 285/333, 285/334
See application file for complete search history.

(56) References Cited

U.S. PATENT DOCUMENTS

| | | | |
|---|---|---|---|
| 2,239,942 A | 4/1941 | Stone et al. | |
| 2,992,019 A | 7/1961 | MacArthur | |
| 3,359,013 A | 12/1967 | Knox et al. | |
| RE30,647 E | 6/1981 | Blose | |
| 4,570,982 A * | 2/1986 | Blose et al. | 285/334 |
| 4,582,348 A | 4/1986 | Dearden | |
| 4,662,659 A | 5/1987 | Blose | |
| 4,688,832 A * | 8/1987 | Ortloff et al. | 285/148.19 |
| 4,703,954 A | 11/1987 | Ortloff | |
| RE34,467 E | 12/1993 | Reeves | |
| 5,360,239 A | 11/1994 | Klementich | |
| 5,454,605 A | 10/1995 | Mott | |
| 5,462,315 A | 10/1995 | Klementich | |
| 6,050,610 A | 4/2000 | Enderle | |
| 6,174,001 B1 | 1/2001 | Enderle | |
| 6,206,436 B1 * | 3/2001 | Mallis | 285/334 |
| 6,270,127 B1 * | 8/2001 | Enderle | 285/334 |
| 6,578,880 B2 | 6/2003 | Watts | |
| 6,682,101 B2 | 1/2004 | Watts | |
| 6,722,706 B2 | 4/2004 | Church | |

FOREIGN PATENT DOCUMENTS

| | | |
|---|---|---|
| EP | 1 302 623 | 4/2003 |
| WO | WO-2004/106797 | 12/2004 |

* cited by examiner

*Primary Examiner*—Aaron Dunwoody
*Assistant Examiner*—Fannie C. Kee
(74) *Attorney, Agent, or Firm*—Osha Liang LLP

(57) ABSTRACT

A threaded connection includes a continuous pin thread including at least a first step, a mid-step, and a second step formed sequentially thereon. A continuous box thread includes at least a first step, a mid-step, and a second step formed sequentially thereon, wherein the steps on the box thread correspond generally in axial position with the steps on the pin thread. The first step has a first wedge ratio, the mid-step has a transition wedge ratio, and the second step has a second wedge ratio, wherein thread leads are substantially constant within each of the steps. The connection is designed such that at make-up of a pin member with a box member, a clearance exists between at least one of corresponding load flanks and corresponding stab flanks on at least one of the first step, the mid-step, and the second step.

16 Claims, 9 Drawing Sheets

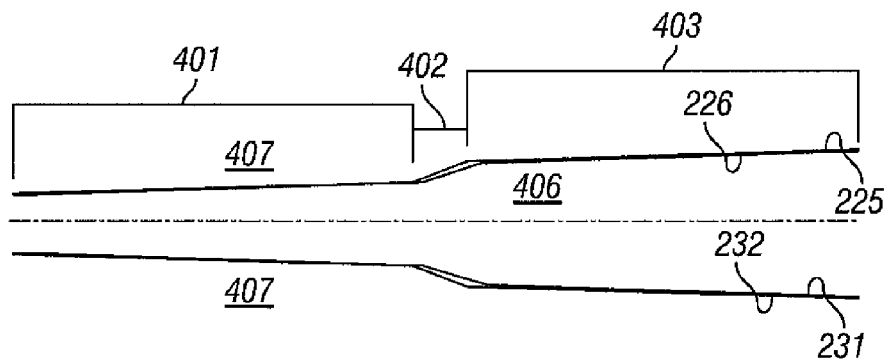
FIG. 4A
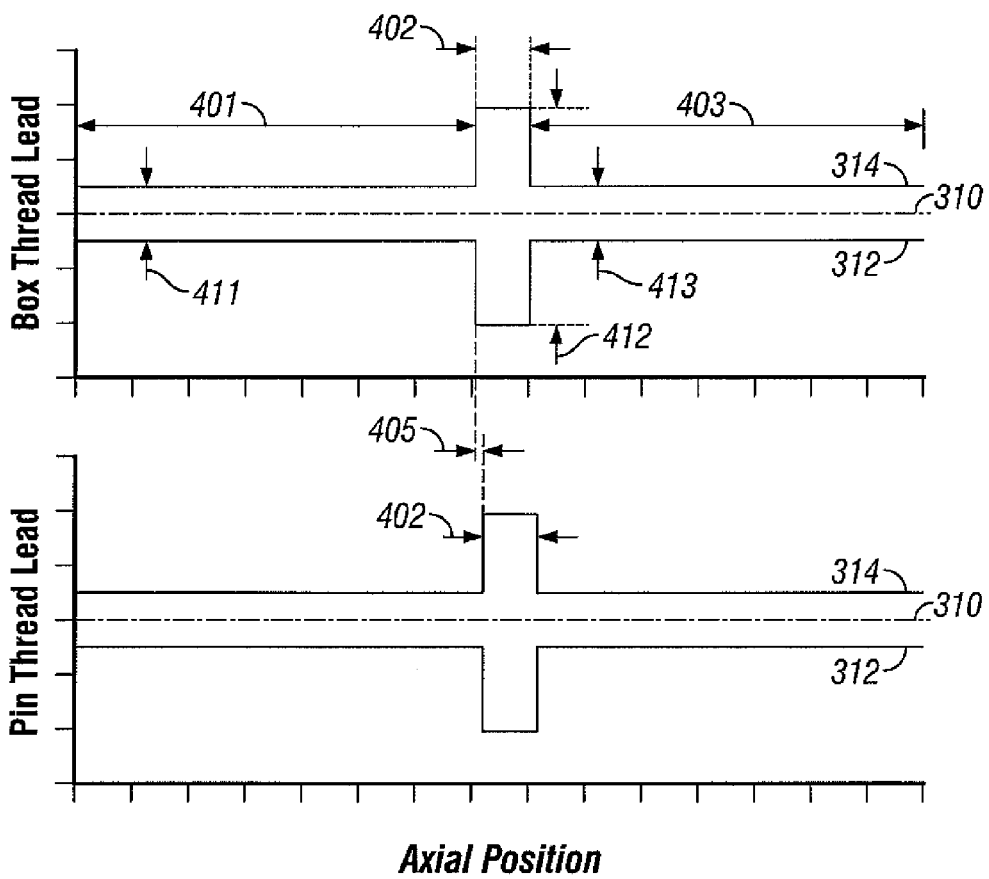
FIG. 4B
FIG. 4C
Axial Position

Axial Position

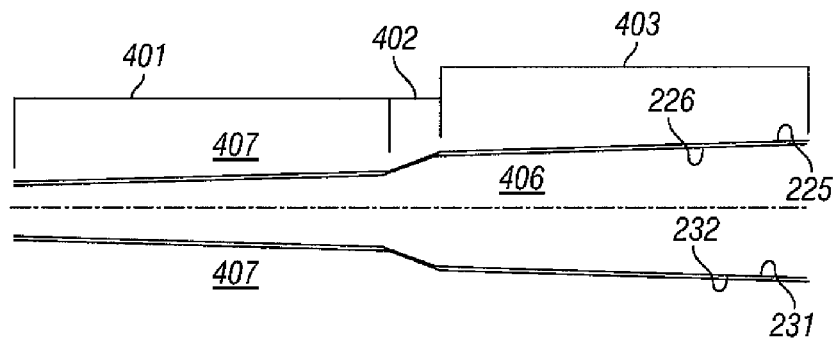
FIG. 6A
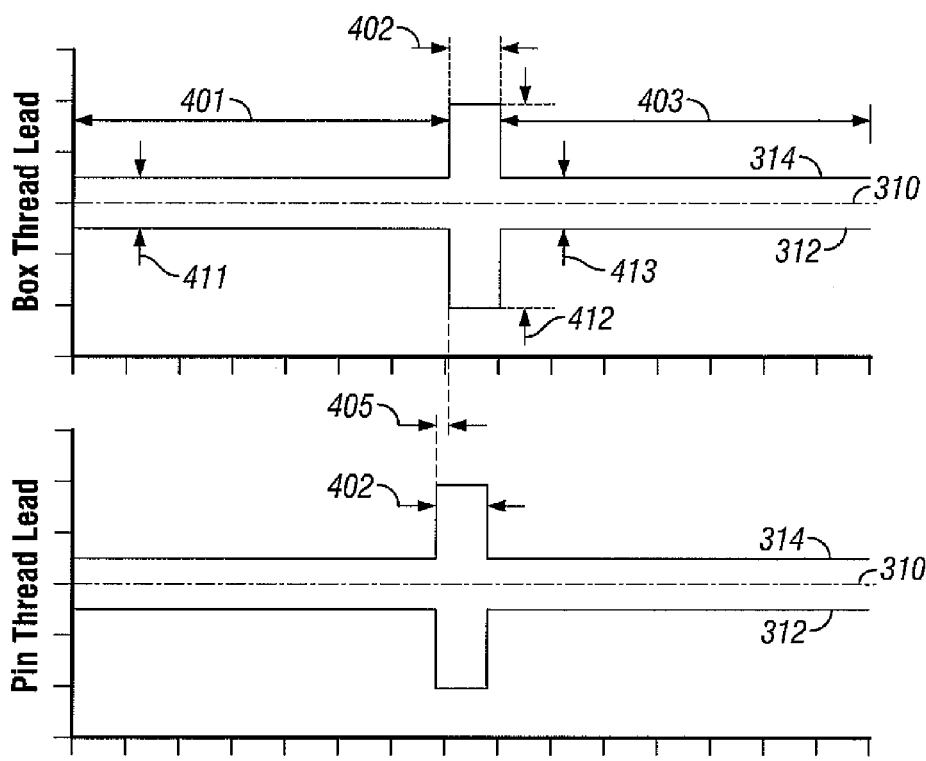
FIG. 6B
FIG. 6C
*Axial Position*

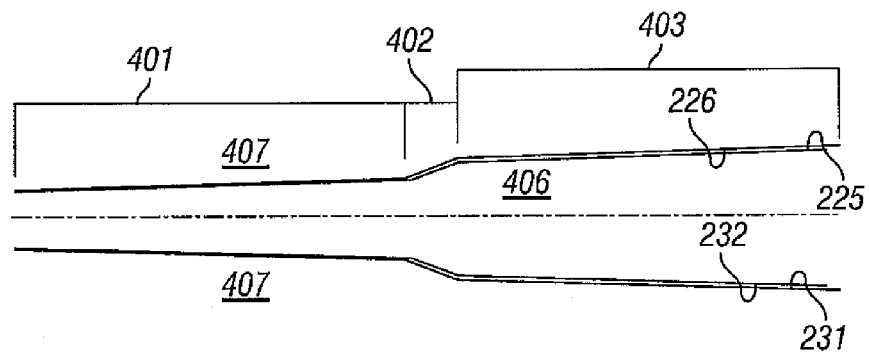
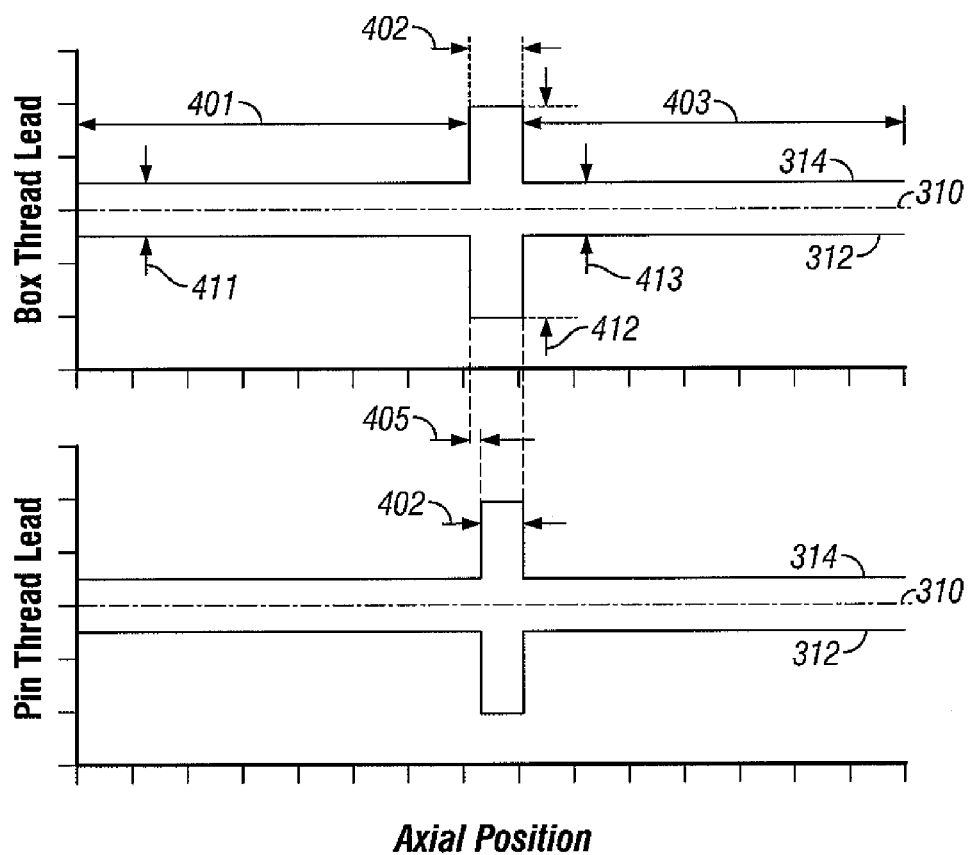

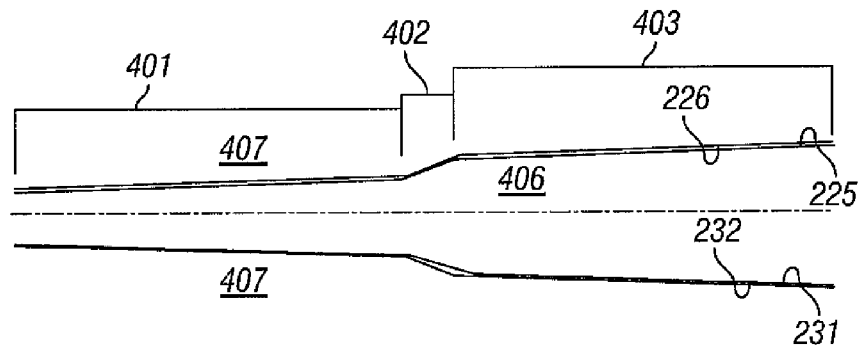
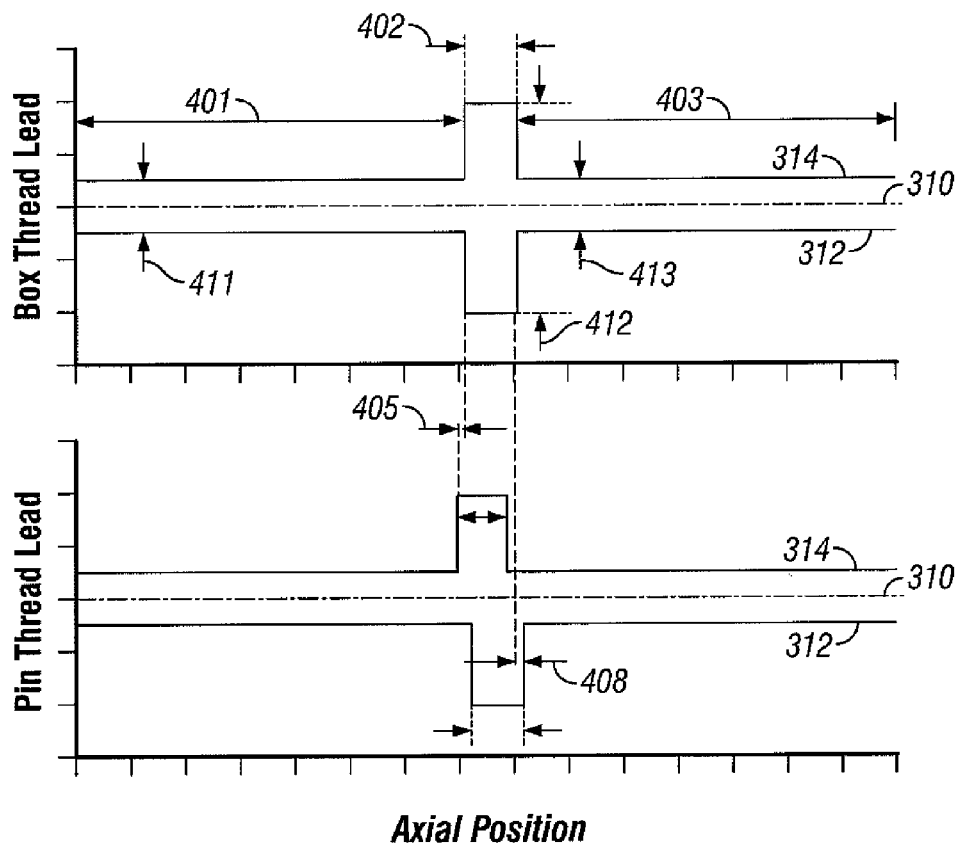

PSEUDO TWO-STEP CONNECTION

CROSS-REFERENCE TO RELATED APPLICATIONS

The present application is related to co-pending United States patent applications filed concurrently herewith titled "Threads with Perturbations" having U.S. patent application Ser. No. 11/027,014, and titled "Floating Wedge Thread for Tubular Connection" having U.S. patent application Ser. No. 11/027,015, all assigned to the assignee of the present application and all incorporated herein by reference in their entireties.

BACKGROUND OF INVENTION

Casing joints, liners, drill pipe, and drill collars (collectively referred to as "tubulars") are often used in drilling, completing, and producing a well. Casing joints, for example, may be emplaced in a wellbore to stabilize a formation, to protect a formation against elevated wellbore pressures (e.g., wellbore pressures that exceed a formation pressure), and the like. Casing joints may be coupled in an end-to-end manner by threaded connections, welded connections, and other connections known in the art. The connections may be designed so as to form a seal between an interior of the coupled casing joints and an annular space formed between exterior walls of the casing joints and walls of the wellbore. The seal may be, for example, an elastomeric seal (e.g. an o-ring seal), a metal-to-metal seal formed proximate the connection, or similar seals known in the art. In some corrections, seals are formed between the internal and external threads. Connections with this characteristic are said to have a "thread seal." As used herein, a "thread seal" means that a seal is formed between at least a portion of the internal thread on the box member and the external thread on the pin member.

It will be understood that certain terms are used herein as they would be conventionally understood where tubular joints are being connected in a vertical position along a central axis of the tubular members such as when making up a pipe string for lowering into a well bore. Thus, the term "load flank" designates the side wall surface of a thread that faces away from the outer end of the respective pin or box member on which the thread is formed and supports the weight (i.e., tensile load) of the lower tubular member hanging in the well bore. The term "stab flank" designates the side wall surface of the thread that faces toward the outer end of the respective pin or box member and supports forces compressing the joints toward each other such as the weight of the upper tubular member during the initial makeup of the joint or such as a force applied to push a lower tubular member against the bottom of a bore hole (i.e., compressive force). The term "face" of the box is the end of the box member facing outward from the box threads and the term "nose" of the pin is the end of the pin member facing outward from the threads of the connection. Upon makeup of a connection the nose of the pin is stabbed into and past the face of the box.

One type of thread commonly used to form a thread seal is a wedge thread. In FIG. 1, a connection having a wedge thread is shown. "Wedge threads" are characterized by threads that increase in width (i.e., axial distance between load flanks 125 and 126 and stab flanks 132 and 131) in opposite directions on the pin member 101 and box member 102. Wedge threads are extensively disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference. On the pin member 101, the pin thread crest 122 is narrow towards the distal end of the pin member 101 while the box thread crest 191 is wide. Moving along the axis 105 (from right to left), the pin thread crest 122 widens while the box thread crest 291 narrows. In FIG. 1, the thread surfaces are tapered, meaning that the pin thread 106 increases in diameter from beginning to end while the box thread 107 decreases in diameter in a complimentary manner. Having a thread taper improves the ability to stab the pin member 101 into the box member 102 and distributes stress in the connection.

Generally, thread seals are difficult to achieve with free-running threads having broad crests and roots, however, the same thread forms may have thread seals when used for wedge threads. Various thread forms may be used for embodiments of the invention disclosed below. One example of a suitable thread form is a semi-dovetailed thread form disclosed in U.S. Pat. No. 5,360,239 issued to Klementich, and incorporated herein by reference. Another thread form includes a multi-faceted load flank or stab flank, as disclosed in U.S. Pat. No. 6,722,706 issued to Church, and incorporated herein by reference. An open thread form with a generally rectangular shape is disclosed in U.S. Pat. No. 6,578,880 issued to Watts. Each of the above thread forms are example thread forms that may be used for embodiments of the invention having either wedge threads or free running threads. Those having ordinary skill in the art will appreciate that the teachings contained herein are not limited to particular thread forms.

For wedge threads, a thread seal is accomplished by the contact pressure caused by interference over at least a portion of the connection between the pin load flank 126 and the box load flank 125 and between the pin stab flank 132 and the box stab flank 131, which occurs when the connection is made-up. Close proximity or interference between the roots 192 and 121 and crests 122 and 191 completes the thread seal when it occurs over at least a portion of where the flank interference occurs. Higher pressure may be contained with increased interference between the roots and crests ("root/crest interference") on the pin member 101 and the box member 102 and by increasing flank interference. This particular connection also includes a metal-to-metal seal that is accomplished by contact between corresponding sealing surfaces 103 and 104 located on the pin member 101 and box member 102, respectively.

A property of wedge threads, which typically do not have a positive stop torque shoulder on the connection, is that the make-up is "indeterminate," and, as a result, the relative position of the pin member and box member varies more for a given torque range to be applied than connections having a positive stop torque shoulder. As used herein, "make-up" refers to threading a pin member and a box member together. "Selected make-up refers to threading the pin member and the box member together with a desired amount of torque, or based on a relative position (axial or circumferential) of the pin member with the box member. For wedge threads that are designed to have both flank interference and root/crest interference at a selected make-up, both the flank interference and root/crest interference increase as the connection is made-up (i.e. increase in torque increases flank interference and root/crest interference). For wedge threads that are designed to have root/crest clearance, the clearance decreases as the connection is made-up. Regardless of the design of the wedge thread, corresponding flanks and corresponding roots and crests come closer to each other (i.e. clearance decreases or interference decreases) during make-up. Indeterminate make-up allows for the flank interference and root/crest interference to be increased by increasing the torque on the connection. Thus, a wedge thread may be able to thread seal higher pressures of gas and/or liquid by designing the connection to have more flank interference and/or root/crest interference or by increasing the torque on the connection, however, this also increases stress on the connection during make-up, which could lead to failure during use.

Free-running threads used for oilfield tubular connections typically do not form thread seals when the connection is made-up. FIG. 2 shows a prior art connection having free-running threads. The free-running threads include load flanks 154 and 155, stab flanks 157 and 158, crests 159 and 162, and roots 160 and 161. As is typical of a connection with free-running threads, this connection relies on a positive stop torque shoulder formed by the contact of surfaces 151 and 152 disposed on the pin member 101 and the box member 102, respectively. The positive stop torque shoulder shown in FIG. 2 is commonly referred to as a "pin nose shoulder." In other connections, the positive stop torque shoulder may instead be formed by the box face 163 and a mating shoulder (not shown) on the pin member 101. The positive stop torque shoulder also provides a seal. Unlike wedge threads, which make-up by the wedging of the pin thread (106 of FIG. 1) and the box thread (107 of FIG. 1), free-running threads rely on the positive stop torque shoulder to load the connection during make-up. To make-up the connection shown in FIG. 2, the pin member 101 and the box member 102 are screwed together until the surfaces 151 and 152 are brought into abutment, at which point the pin load flank 154 and box load flank 155 are also in abutment. Additional torque is applied to the pin member 101 and the box member 102 to load the surfaces 151 and 152 and the pin load flank 154 and box load flank 155 until the desired amount of make-up torque has been applied to the connection.

The connection shown in FIG. 2 does not accomplish a thread seal because of the large gap 153 that exists between the pin stab flank 157 and box stab flank 158. The gap 153 occurs because of how free-running threads with positive stop torque shoulders are loaded. Applying torque to the connection during make-up against the positive stop torque shoulder causes the pin member 101 to be compressed while the box member 102 is stretched in tension. Note that when a box face shoulder is used, the box member 102 is compressed while the pin member 101 is stretched in tension. The force between the pin member 101 and the box member 102 is applied through the pin load flank 154 and box load flank 155. The pin stab flank 157 and the box stab flank 158 are not loaded during make-up. This results in contact pressure between the load flanks 154 and 155 and a gap between stab flanks 157 and 158. As discussed above, a wedge thread (as shown in FIG. 1) is able to form a thread seal in part because of the interference between the load flanks 125 and 126 and the stab flanks 132 and 131. For wedge threads, this occurs near the end of the make-up of the connection because of the varying width of the pin thread 106 and the box thread 107. To have similar interference between the load flanks 154 and 155 and stab flanks 157 and 158 on a cylindrical (i.e. non-tapered) free-running thread, the interference would exist substantially throughout the make-up of the connection because the pin thread 106 and the box thread 107 have a continuous width. Further, root/crest interference, if any, would exist substantially through-out the make-up of the connection. This could lead to galling of the threads and difficulty in making up the connection.

The variance in thread width for a wedge thread occurs as a result of the load flanks having different leads than the stab flanks. A thread lead may be quantified in inches per revolution. Note that this is the inverse of a commonly used term "thread pitch," which is commonly quantified as threads per inch. A graph of the leads for a prior art wedge thread is shown in FIG. 3A. For this connection, the load lead 14 is constant over the length of the connection and greater than the stab lead 12, which is also constant. The nominal lead is shown as item 10. As used herein, "nominal lead" refers to the average of the load lead 14 and the stab lead 12. The thread will widen with each revolution by the difference in the load lead 14 and the stab lead 12. The difference in the load lead 14 and the stab lead 12 is sometimes referred to as the "wedge ratio." For a free-running thread (i.e. non-wedge thread), the load lead 14 and the stab lead 12 would be substantially equal causing the free-running thread to have a substantially constant thread width (i.e. a zero wedge ratio).

Intentional variances in thread leads have been disclosed in the prior art for the purposes of load distribution, however, the present inventor is unaware of variances in thread leads to form a thread seal for a wedge thread or a free-running thread. One example of a varied thread lead for stress distribution is disclosed in U.S. Pat. No. 4,582,348 issued to Dearden, et al. That patent is incorporated herein by reference in its entirety. Dearden discloses a connection with free-running threads that has the pin thread and box thread divided into three portions with different leads (note that Dearden refers to thread pitch, which is quantified as threads per inch). In FIG. 3B, a graph of the thread leads for the box member and the pin member is shown. As shown in the graph, at one end of the connection, the pin thread lead 21 is larger than the box thread lead 22. In the intermediate portion 23, the pin thread lead 21 and box thread lead 22 are substantially equal. Then, at the other end of the connection, the box thread lead 22 is larger than the pin thread lead 21. In Dearden, the changes in the pin thread lead 21 and box thread lead 22 are step changes (i.e. substantially instantaneous changes in the lead). The varied thread leads disclosed by Dearden are intended to distribute loading across a greater portion of the connection, and have no effect on the inability of the free-running threads to form a thread seal. Dearden does not disclose varying a load lead or stab lead independent of each other.

Another connection is disclosed in U.S. application Ser. No. 10/126,918 entitled "Threaded Connection Especially for Radially Plastically Expandable Conduit," ("Sivley") and assigned to the assignee of the present invention. That application is incorporated herein by reference in its entirety. Sivley discloses connections having a variance in load lead and/or stab lead on one or both of the pin member and the box member. A graph of an embodiment disclosed by Sivley is shown in FIG. 3C. Sivley discloses varying the load lead 14 relative to the stab lead 12 at a selected rate over at least a portion of the pin thread and/or box thread. In FIG. 3C, the connection is a wedge thread as shown by the difference between the load lead 14 and the stab lead 12. The load lead 14 and the stab lead 12 converge at a linear rate towards the end of the thread. Sivley discloses various other embodiments having load leads 14 and stab leads 12 that vary at linear rates relative to each other. The variance in the thread leads distributes the loads experienced by the connection over the length of the connection.

FIG. 9 shows a prior art two-step connection. The threads that form the connection are separated on two different "steps," a large step indicated by the bracket 31 and a small step indicated by the bracket 32. The portion between the large step 31 and the small step 32 is commonly referred to as a mid-step 901. In some connections, the mid-step 901 may be used as a metal-to-metal seal. The pin thread crest on the small step 32 of the pin member 101, at its full design height, does not interfere with the box thread crest on the large step 31 of the box member 102 when the pin member 101 is stabbed into the box member 102. The diameter of the small step 32 of the pin member 101 is smaller than the smallest crest-to-crest thread diameter on the large step 31 of the box member 102. The pin thread 106 on the small step 32 can be stabbed past the box thread 107 on the large step 31. The threads on both the small step 32 and the large step 31, which have substantially the same nominal lead, engage with each revolution to make-up the connection. Thus, the number of revolutions during which the threads slide or rub against each other is reduced for the same number of engaged threads. A two-step connection allows for each of the steps to have threads with different characteristics as long there is little or no variance in the nominal lead of the threads on the steps.

A two-step wedge thread connection is disclosed in U.S. Pat. No. 6,206,436 issued to Mallis and assigned to the assignee of the present invention. That patent is incorporated herein by reference. Mallis discloses a two-step wedge thread connection having different wedge ratios, one of which is considered to be an "aggressive" wedge ratio and the other a "conservative" wedge ratio. "Aggressive" refers to the larger wedge ratio, and "conservative" refers to the smaller wedge ratio. Everything else the same, the greater the wedge ratio, the more determinate the make-up. Too large of a wedge ratio may have an inadequate wedging effect, which can allow the connection to back-off during use. Smaller wedge ratios are better able to resist backing-off of the connection. Too small of a wedge ratio may have such an indeterminate make-up that galling may occur over the lengthened make-up distance. Mallis discloses that one of the steps can have a wedge ratio that is optimized for a more determinate make-up (aggressive), while the other step can have a wedge ratio that is optimized for preventing back-off of the connection (conservative).

In U.S. Pat. Nos. 6,174,001 and 6,270,127 issued to Enderle and assigned to the assignee of the present invention, two-step, low torque wedge threads for tubular connectors are disclosed. Those patents are incorporated herein by reference in their entirety. One of the steps is provided so that there is interference contact at makeup along at least one of the complementary stab flanks, load flanks, roots, and crests while clearance is provided along another step along at least one of the complementary stab flanks, load flanks, roots, and crests, which reduces the amount of torque required for make-up of the connection while retaining torque sensitivity, scaling capability, and threads necessary for structural purposes.

One problem with two-step connections is that the connection must be thick to reach 100 percent pipe body efficiency. As used herein, "pipe body efficiency" is the tensile strength of the connection relative to the tensile strength of the tubular. The primary reason for needing a thicker connection is the unengaged space of the mid-step, which is required so that the threads on the large step can clear the threads on the small step during stabbing. The mid-step, due to the lack of thread engagement, does not contribute to the overall strength of the connection. The advantages of having two separate threads often makes up for the decreased pipe body efficiency, however, it is desirable to have a single step thread that can exhibit the advantages of two-step connections.

SUMMARY OF INVENTION

In one aspect, the present invention relates to a threaded connection having wedge threads. The threaded connection includes a pin member and a box member having a continuous pin thread and a continuous box thread, respectively. The pin thread has a pin thread crest, a pin thread root, a pin load flank, and a pin stab flank. The pin thread includes at least a first step, a mid-step, and a second step formed sequentially thereon. The box thread has a box thread crest, a box thread root, a box load flank, and a box stab flank. The box thread includes at least a first step, a mid-step, and a second step formed sequentially thereon. The steps on the box thread correspond generally in axial position with the steps on the pin thread. The first step has a first wedge ratio, the mid-step has a transition wedge ratio, and the second step has a second wedge ratio. The thread leads are substantially constant within each of the steps. The connection is designed such that, at make-up of the pin member with the box member, a clearance exists between at least one of the corresponding load flanks and the corresponding stab flanks on at least one of the first step, the mid-step, and the second step.

In another aspect, the present invention relates to a method of manufacturing a threaded connection having wedge threads using a machine tool with a programmable control. The method includes forming a pin member and a box member having a continuous pin thread and a continuous box thread, respectively. The pin thread has a pin thread crest, a pin thread root, a pin load flank, and a pin stab flank. The pin thread includes at least a first step, a mid-step, and a second step formed sequentially thereon. The box thread has a box thread crest, a box thread root, a box load flank, and a box stab flank. The box thread includes at least a first step, a mid-step, and a second step formed sequentially thereon. The steps on the box thread correspond generally in axial position with the steps on the pin thread. The first step has a first wedge ratio, the mid-step has a transition wedge ratio, and the second step has a second wedge ratio. The thread leads are substantially constant within each of the steps. The connection is designed such that, at make-up of the pin member with the box member, a clearance exists between at least one of the corresponding load flanks and the corresponding stab flanks on at least one of the first step, the mid-step, and the second step.

In another aspect, the present invention relates to a threaded connection having wedge threads. The threaded connection includes a pin member and a box member having a continuous pin thread and a continuous box thread, respectively. The pin thread has a pin thread crest, a pin thread root, a pin load flank, and a pin stab flank. The pin thread includes at least a first step, a mid-step, and a second step formed sequentially thereon. The box thread has a box thread crest, a box thread root, a box load flank, and a box stab flank. The box thread includes at least a first step, a mid-step, and a second step formed sequentially thereon. The steps on the box thread correspond generally in axial position with the steps on the pin thread. The first step has a first wedge ratio, the mid-step has a transition wedge ratio, and the second step has a second wedge ratio. The thread leads are substantially constant within each of the steps. The connection is designed such that, at make-up of the pin member with the box member, a clearance exists between both the corresponding load flanks and the corresponding stab flanks on at least one of the first step, the mid-step, and the second step.

Other aspects and advantages of the invention will be apparent from the following description and the appended claims.

BRIEF DESCRIPTION OF DRAWINGS

FIG. 4A shows a schematic representation of a threaded connection in accordance with one embodiment of the present invention.

FIGS. 4B and 4C show graphs of thread leads versus axial position corresponding to the embodiment shown in FIG. 4A.

FIG. 6A shows a schematic representation of a threaded connection in accordance with one embodiment of the present invention.

FIGS. 6B and 6C show graphs of thread leads versus axial position corresponding to the embodiment shown in FIG. 6A.

FIG. 7A shows a schematic representation of a threaded connection in accordance with one embodiment of the present invention.

FIGS. 7B and 7C show graphs of thread leads versus axial position corresponding to the embodiment shown in FIG. 7A.

FIG. 8A shows a schematic representation of a threaded connection in accordance with one embodiment of the present invention.

FIGS. 8B and 8C show graphs of thread leads versus axial position corresponding to the embodiment shown in FIG. 8A.

DETAILED DESCRIPTION

The present invention relates to threads for tubular connections. More specifically, the present invention relates to threads having two-step characteristics formed on a single thread on a tapered connection.

For the purpose of clarity, several terms are explicitly defined below. As used herein, "a thread lead" refers generally to the group of leads consisting of the load lead, the stab lead, and the nominal lead.

As used herein, "helical length" refers to the number of turns of the thread that the contactor is disposed, and may be expressed in the number of degrees about the axis of the tubular (i.e. 360 degrees is one thread pitch).

Embodiments of the present invention have variations in wedge ratios on a single thread such that the connection has at least some characteristics of a two-step connection. Embodiments of the present invention are characterized by at least two distinct portions joined by a transition zone between the two distinct portions. The two distinct portions may be referred to using the same terminology used for two-step connections although embodiments of the present invention have a single step. In some embodiments, one step may have a different thread height (as measured from root to crest) in order to form a higher pressure thread seal.

Figure 9:
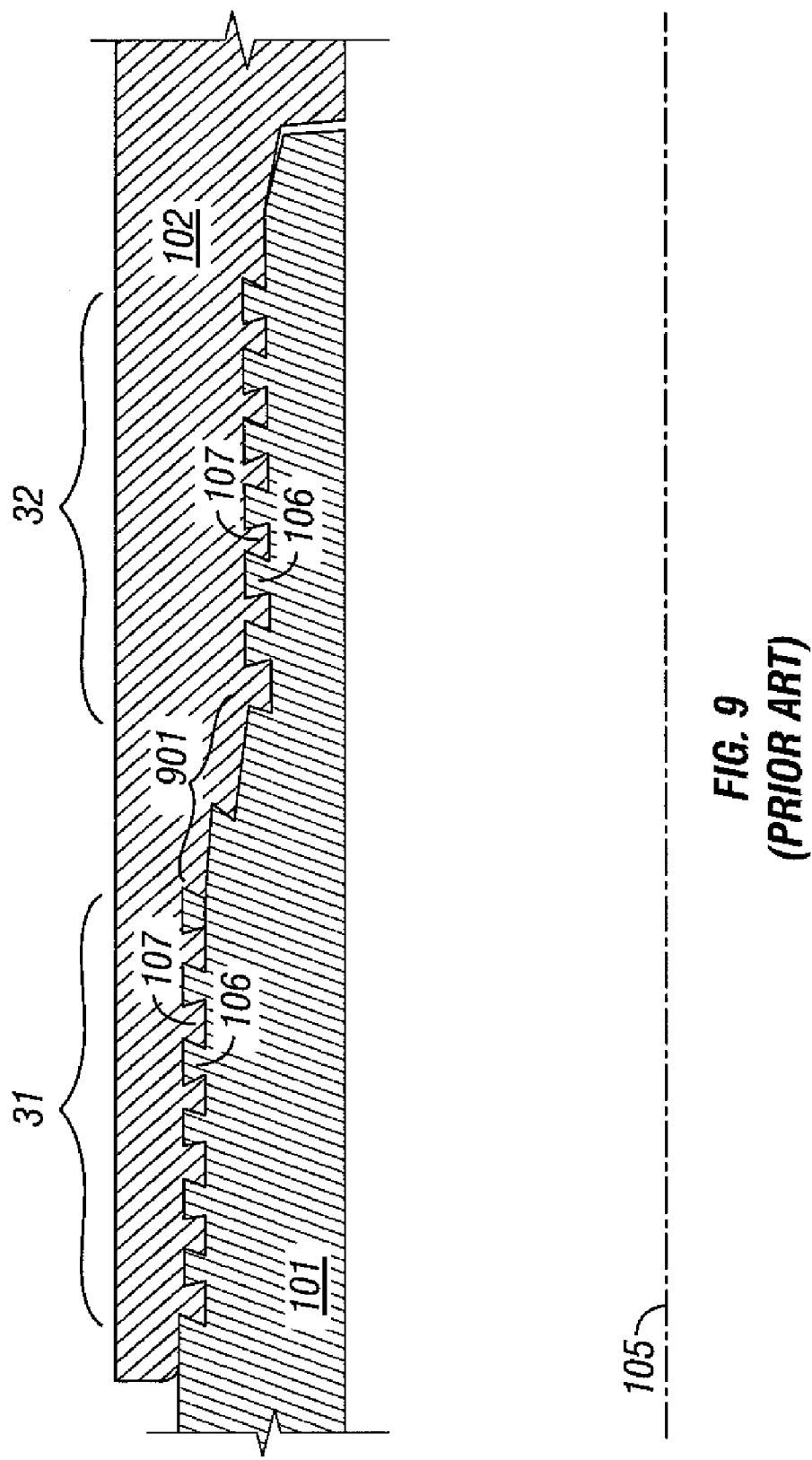
FIG. 9 shows a cross section of a prior art two-step connection with a free-running thread.

Turning to FIGS. 4A-C, a pseudo two-step thread in accordance with one embodiment of the present invention is shown. FIGS. 4A-C provide an exaggerated example of a pseudo two-step for illustrative purposes. In FIG. 4A, the pin thread 406 that corresponds to the graph in FIG. 4C is shown at a selected make-up with the box thread 407 that corresponds to the graph in FIG. 4B. In this particular embodiment the pin thread 406 and the box thread 407 have been designed to have interference between the load flanks 225 and 226 and the stab flanks 231 and 232 on both a first step 401 (compare to the small step 32 in FIG. 9) and a second step 403 (compare to the large step 31 in FIG. 9), while having a selected clearance between the flanks on the mid-step 402. In one embodiment, flank interference may occur on one step before the other step during make-up, with both the first step 401 and the second step 403 having interference at the selected make-up. Further, in one embodiment, one or both the small step 32 and the large step 31 may have interference between only the load flanks or the stab flanks instead of both.

To achieve the pseudo two-step configuration shown in FIG. 4A, the load lead 314 and the stab lead 312 may be varied in a complementary manner on both the pin thread 406 and the box thread 407, as shown in FIGS. 4B and 4C. The nominal lead 310 has been kept substantially constant over the length of both the pin thread 406 and the box thread 407. Along the first step 401, the difference between the load lead 314 and the stab lead 310 (i.e. wedge ratio 411) is substantially constant. At the end of the first step 401, the wedge ratio 411 increases to wedge ratio 412 by increasing the load lead 314 by a selected amount while proportionally decreasing the stab lead 312 such that the nominal lead 310 is substantially maintained. The wedge ratio 412 is larger than both the wedge ratio 411 on the first step 401 and the wedge ratio 413 on the second step 403. This length of the threads at the heightened wedge ratio 412 provides the transition between the first step 401 and the second step 403, and may be referred to as the mid-step 402 using the terminology for two-step connections. The mid-step 402 is minor in helical length compared to the first step 401 and the second step 403. In some embodiments, the helical length of the mid-step 402 may be in increments of about 360 degrees to prevent eccentric loading of the connection. After the mid-step 402, the wedge ratio 412 decreases to the wedge ratio 413 on the second step 403, which is about equal to the wedge ratio 411 on the first step 401 in this embodiment.

Continuing with FIGS. 4A-4C, this embodiment has an offset 405 between the mid-step 402 on the pin thread 406 and the box thread 407. The mid-step 402 on the box thread 407 begins at a slightly earlier selected axial position than the mid-step 402 on the pin thread 406. This causes the box thread 407 to "open up" or widen slightly earlier than the pin thread 406, which causes the selected clearance between flanks to occur on the mid-step 402. To return the threads to having flank interference on the second step 403, the second step 403 may also begin at an earlier selected axial position on the box thread 407, which allows the pin thread 406 to "catch up" in width. The variations in the load lead 314 and the stab lead 312 over the length of the threads allows for the connection to behave as if it has two separate steps and a mid-step, as in a two-step connection. This allows for a connection to be designed to have different behavior in each portion of the connection. Those having ordinary skill in the art will appreciate that after using the teachings of the present disclosure, many combinations of first steps 401, mid-steps 402, and second steps 403 may be achieved using features for two-step connections known in the art. Examples of such connections are discussed below.

Figure 1:
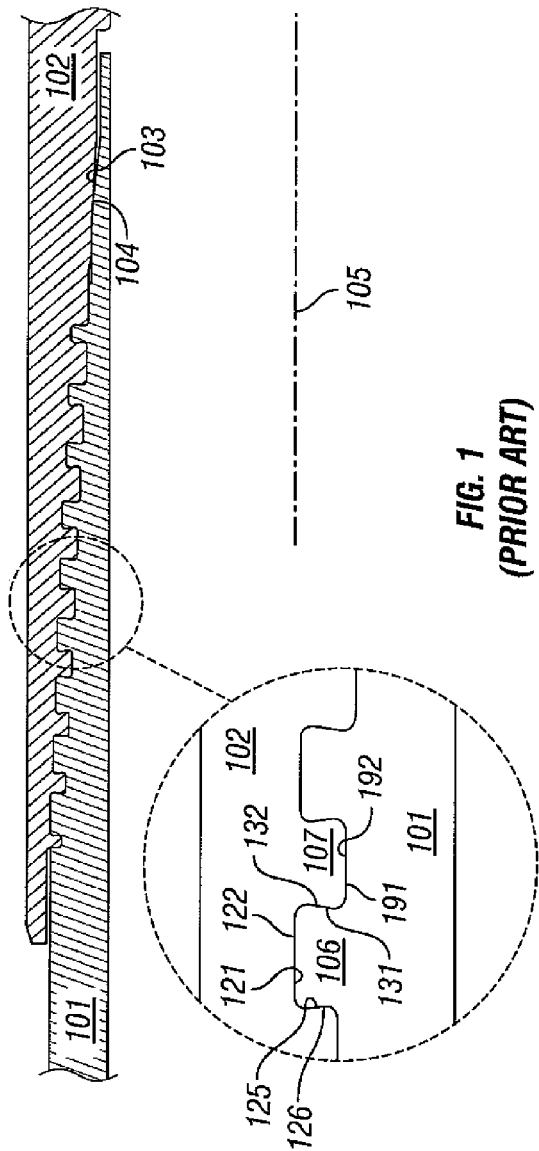
FIG. 1 shows a cross section of a prior art connection having a wedge thread.
Figure 2:
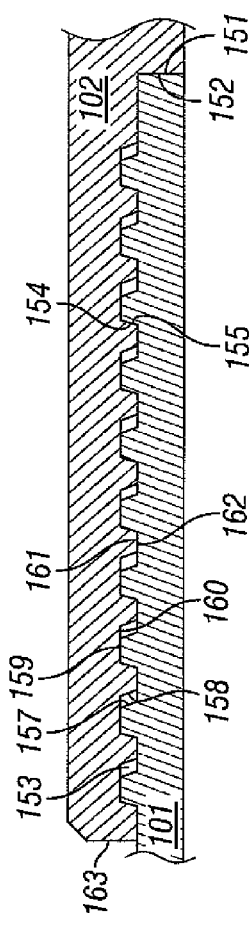
FIG. 2 shows a cross section of a prior art connection having a free-running thread.
Figure 3A:
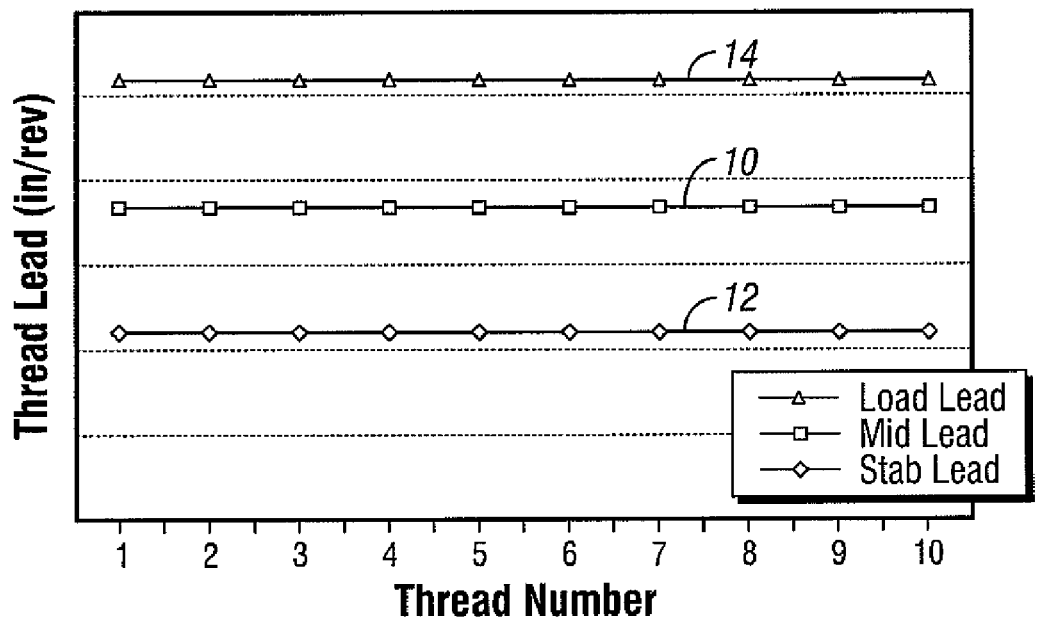
FIGS. 3A, 3B, and 3C show graphs of thread leads for prior art connections.
Figure 3C:
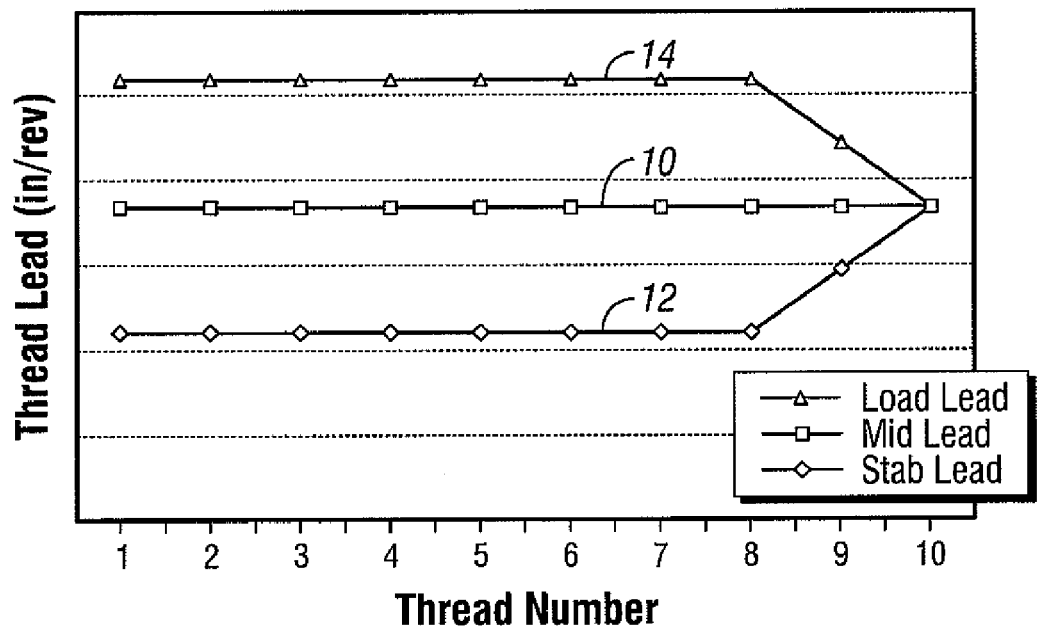
Figure 3B:
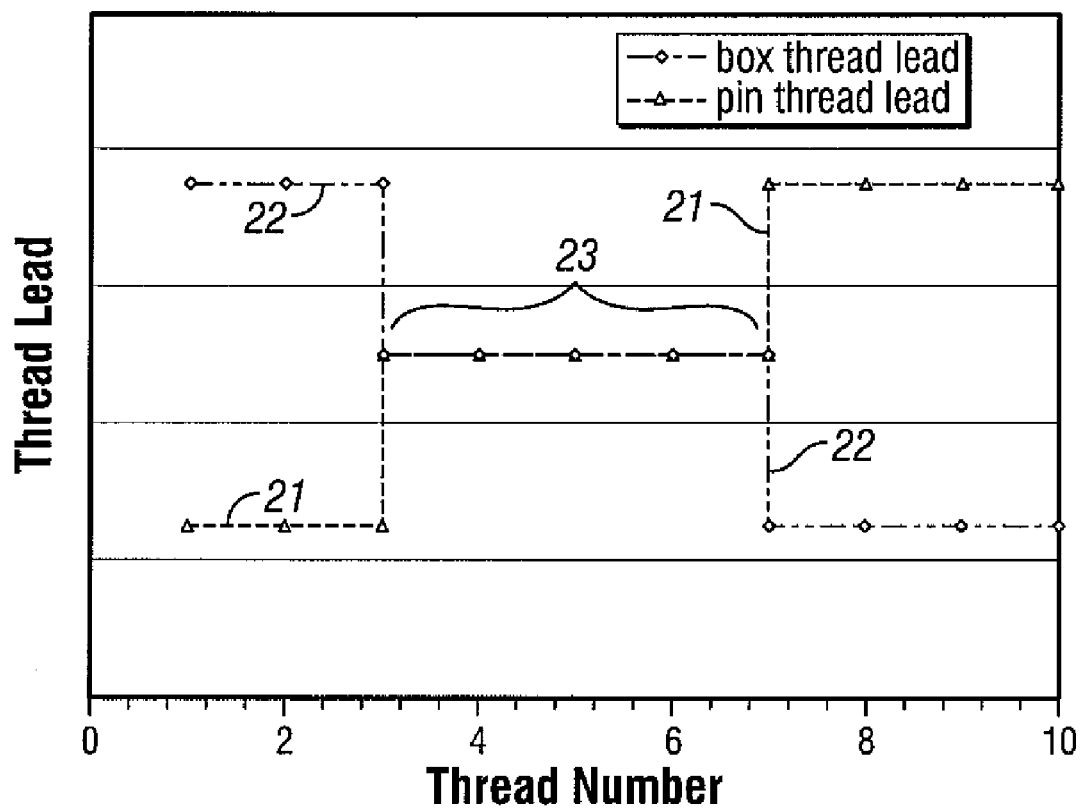
Figure 5A:
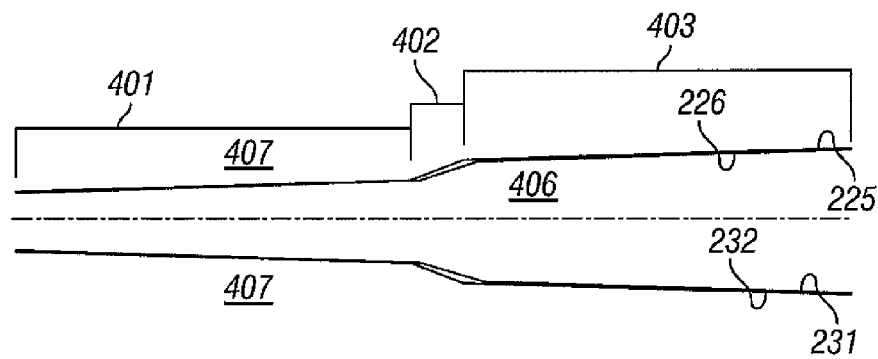
FIG. 5A shows a schematic representation of a threaded connection in accordance with one embodiment of the present invention.
Figure 5B:
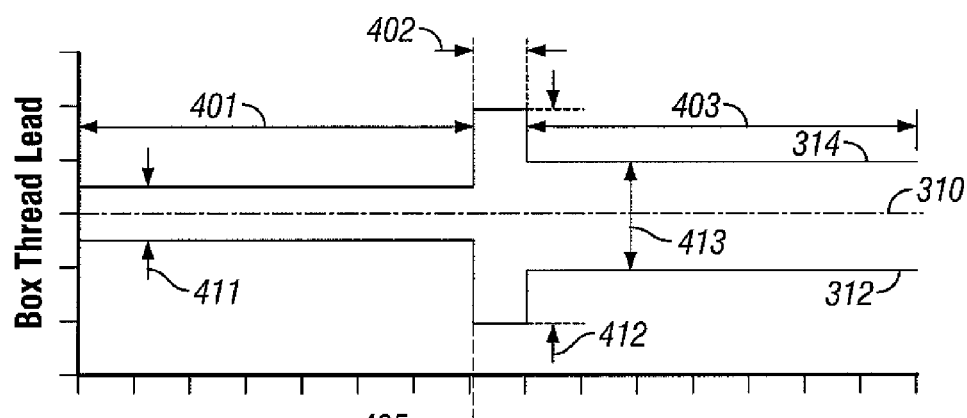
FIGS. 5B and 5C show graphs of thread leads versus axial position corresponding to the embodiment shown in FIG. 5A.
Figure 5C:
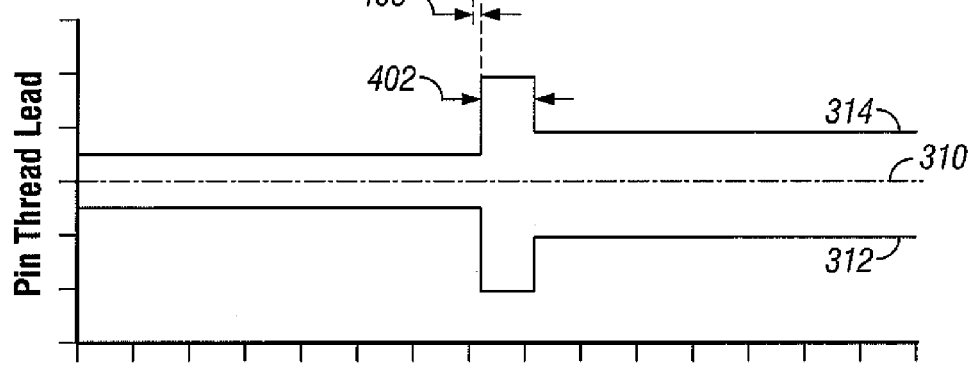

In FIGS. 5A-5C, a pseudo two-step thread in accordance with one embodiment of the present invention is shown. In FIG. 5A, the pin thread 406 that corresponds to the graph in FIG. 5C is shown at a selected make-up with the box thread 407 that corresponds to the graph in FIG. 5B. In this particular embodiment, the pin thread 406 and the box thread 407 have been designed to have interference between the load flanks 225 and 226 and the stab flanks 231 and 232 on both a first step 401 and a second step 403, while having a selected clearance between the flanks on the mid-step 402. The thread shown in FIGS. 5A-5C differs from the one shown in FIGS. 4A-4C because the wedge ratio 413 of the second step 403 is greater than wedge ratio 411 of the first step 401. Two-step connections having differential wedge ratios are disclosed in U.S. Pat. No. 6,206,436 issued to Mallis, which was discussed above. Mallis' teachings (including all of the advantages), as they apply to two-step connections having two different wedge ratios, are generally applicable to the pseudo two-step connection disclosed herein. Using the terminology from Mallis, in the embodiment shown in FIGS. 5A-5C, the second step 403 has the "aggressive" wedge ratio 413, while the first step 401 has the "conservative" wedge ratio 411.

Turning to FIGS. 6A-6C, another pseudo two-step thread in accordance with one embodiment of the present invention is shown. In this particular embodiment, the pin thread 406 and the box thread 407 have been designed to have interference between the load flanks 225 and 226 and the stab flanks 231 and 232 on the mid-step, while selected clearances exist between the flanks on the first step 401 and the second step 403. The embodiment shown in FIG. 6A may be desirable for forming a thread seal at the mid-step 402. In one embodiment, the mid-step 402 may also have increased root/crest interference as disclosed in the concurrently filed U.S. patent application titled "Threads with Perturbations." In this particular embodiment, the helical length of the mid-step 402, which experiences load before the first step 401 and the second step 403, is about 360 degrees in order to prevent eccentric loading. Although FIG. 6A shows the selected clearances between flanks on the first step 401 and the second step 403 as about equal, those having ordinary skill in the art will appreciate that, in other embodiments, the selected clearances may be different. For example, the connection may be designed such that the second step 403 has a smaller selected clearance than the first step 401. In such an embodiment, the second step 403 would be loaded under tension before the first step 401. In other embodiments, the selected clearances may be different between load flanks and stab flanks on the same step.

In FIGS. 7A-7C, another pseudo two-step thread in accordance with one embodiment of the present invention is shown. In this particular embodiment, the pin thread 406 and the box thread 407 have been designed to have interference between the load flanks 225 and 226 and the stab flanks 231 and 232 on the first step 401, while selected clearances exist between the flanks on the mid-step 402 and the second step 403. FIGS. 7B and 7C show how the pseudo two-step thread in FIG. 7A can be achieved. In this embodiment, the mid-step 402 on the box thread 407 has an offset 405 from the mid-step 402 on the pin thread 406, which causes the box thread 407 to open up before the pin thread 406 widens. This causes a selected clearance to occur between the flanks on the mid-step 402. To maintain at least some clearance between the flanks on the second step 403, the mid-step 402 on the pin thread 406 has a shorter helical length than the mid-step 402 on the box thread 407 such that it ends at about the same axial position as the mid-step 402 on the box thread 407. The configuration shown in FIG. 7A allows for stresses to be distributed along the connection based on the amount of stress experienced by the connection. For example, a pseudo two-step connection may be designed to initially load the first step 401 when pulled in tension, and then load the second step 403 prior to yielding the threads in the first step 401. Such a design is disclosed for two-step connections in the concurrently filed U.S. patent application titled "Floating Wedge Thread for Tubular Connection."

Turning to FIGS. 8A-8C, another pseudo two-step thread in accordance with one embodiment of the present invention is shown. In this particular embodiment, the pin thread 406 and the box thread 407 have been designed to have alternating interference and clearance between the load flanks 225 and 226 and the stab flanks 231 and 232 on the steps. In designing the thread shown in FIG. 8A, the first step 401 is made to have interference between the stab flanks 231 and 232, while having clearance between the load flanks 225 and 226. To alternate between interference and clearance, the load lead 314 and the stab lead 312 of one of the pin thread 406 and the box thread 407 may be offset from each other in their axial positions. In this embodiment, the pin thread 406 has the offset 408. In another embodiment, the offset 408 may be on the box thread 407.

Continuing with the embodiment shown in FIGS. 8A-8C, the increase in the load lead 314 of the pin thread 406 begins before the increase in the load lead 314 of the box thread 407. This causes the pin thread 406 to widen on the load flank side, which brings the load flanks 225 and 226 into interference at the mid-step 402. Then, the decrease in the stab lead 312 of the box thread 407 begins before the decrease in the stab lead 312 of the pin thread 406, which brings the stab flanks 231 and 232 out of interference at the mid-step 402. The flank interference is then reversed back at the end of the mid-step 402 by decreasing the load leads 314 and increasing the stab leads 312 with the same offsets in axial position. This causes the second step 403 to have interference between the stab flanks 231 and 232, while having clearance between the load flanks 225 and 226. In another embodiment, the alternating of interference and clearance may be reversed (i.e. having interference between the load flanks 225 and 226 on first step 401, while having clearance between the stab flanks 231 and 232).

While each of the above embodiments shows at least some clearance between flanks, it should be noted that some embodiments of the pseudo two-step connection may be designed to have varying amounts of interference between flanks on each of the first step, the mid-step, and the second step at a selected make-up. A pseudo two-step connection may be made such that interference occurs in a sequential manner between load flanks and stab flanks on the first step, the mid-step, and the second step. For example, by using the offsetting methods of load lead and stab lead changes discussed with respect to the above embodiments, a pseudo two-step connection may be designed such that during make-up, the flanks on the second step come into interference. Then as the make-up continues, the flanks on the first step come into interference, with flanks on the mid-step coming into interference last. As discussed above, flank interference increases during make-up of a wedge thread connection. As a result, at a selected make-up, the step on which flank interference occurs first will have the most interference. Those having ordinary skill in the art will appreciate that many combinations and sequences of interference and clearance between flanks are possible using the teachings of the present invention. Thus, the scope of the present invention should not be limited to the select number of embodiments disclosed herein.

Another variation that is possible is the relative helical lengths of the first step, the mid-step, and the second step. While the above embodiments have shown first steps that are substantially equal in helical length to the second steps, those having ordinary skill in the art will appreciate the first step and second step may be unequal in helical length. For example, on a connection having about 10 thread turns (i.e. about 3600 degrees in helical length), the first step may be about 4 thread turns (i.e. about 1440 degrees in helical length), while the mid-step may be about 1 thread turn and the second step may be about 5 thread turns.

It should be noted that the graphs of thread leads for the above embodiments are idealized as step changes in the thread leads. In practice, the changes in the thread leads may not be as instantaneous as shown in the graphs due to the manufacturing process used to make the threads. For example, in one embodiment, a computer numerically controlled ("CNC") lathe may be used. CNC machines may be controlled by CNC programs. Typically, the CNC program consists of positions for each axis of control. For example, if the CNC lathe has an axial position and a rotational position, the program would have an axial position value corresponding with each rotational position. Because a CNC lathe is usually rotating at a set speed measured in rotations per minute ("RPM"), the CNC program typically has the rotational positions in order and at set increments as the part is rotated in the machine. The increments at which the rotational positions are spaced is commonly referred to as the "resolution" of the lathe. For example, if the resolution is about 90 degrees, a data point will exist for each sequential increment of about 90 degrees. An axial position would be selected for each increment. Typically, the CNC lathe will move the axial position at a substantially constant speed between points. The speed is selected as required to reach the next axial position at substantially the same time as the corresponding rotational position. The thread lead can be selected by calculating the value for the increments such that for each revolution, the axial position advances by a distance substantially equal to the thread lead. For example, a lead of 1 inch per revolution would advance by a ¼ inch every 90 degrees. Those having ordinary skill in the art will be able to apply the above teachings for use with other manufacturing methods. The resolution of the lathe used may effect the amount of offset between steps. Another result of using machine tools is that the momentum of the moving parts and response time in the controls may result in a more smoothed out change in thread leads. Although the precise changes in thread leads between the first step, the mid-step, and the second step may vary by production method, the benefits of the pseudo two-step connection may still be realized.

It should be noted that embodiments of the present invention have at least a first step and a second step with a transition zone (i.e. mid-step) joining the first step and the second step. The first step, the mid-step, and the second step are formed sequentially on both the pin thread and the box thread. Those having ordinary skill in the art will appreciate that additional steps may be added to the pin thread and the box thread without departing from the scope of the present invention. Further, embodiments of the present invention may be formed on an actual two-step connection. For example, a pseudo two-step in accordance with the above disclosure may be formed on one of the small step and the large step of a two-step connection such that the connection essentially has three steps.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A threaded connection having wedge threads, the threaded connection comprising:
   a pin member comprising a continuous pin thread having a pin thread crest, a pin thread root, a pin load flank, and a pin stab flank, wherein the continuous pin thread comprises at least a first step, a mid-step, and a second step formed sequentially thereon;
   a box member comprising a continuous box thread having a box thread crest, a box thread root a box load flank, and a box stab flank, wherein the continuous box thread comprises at least a first step, a mid-step, and a second step formed sequentially thereon, the steps on the continuous box thread corresponding generally in axial position with the steps on the pin thread,
   wherein the first step has a first wedge ratio, the mid-step has a transition wedge ratio, and the second step has a second wedge ratio,
   wherein thread leads are substantially constant within each of the steps,
   wherein the connection is designed such that at make-up of the pin member with the box member, a clearance exists between at least one of the corresponding load flanks and the corresponding stab flanks on at least one of the first step, the mid-step, and the second step.

2. The threaded connection of claim 1, wherein a beginning of the mid-step on the continuous pin thread is offset in axial position from a beginning of the mid-step on the box thread.

3. The threaded connection of claim 1, wherein a selected clearance exists between both the corresponding load flanks and the corresponding stab flanks on the mid-step.

4. The threaded connection of claim 1, wherein a selected clearance exists between both the corresponding load flanks and the corresponding stab flanks on both the first step and the second step.

5. The threaded connection of claim 1, wherein one of the first wedge ratio and the second wedge ratio is greater than the other.

6. The threaded connection of claim 1, wherein the first wedge ratio and the second wedge ratio are substantially equal.

7. The threaded connection of claim 1, wherein one of the continuous pin thread and the continuous box thread has a greater height on one of the first step, the mid-step, and the second step.

8. The threaded connection of claim 1, wherein during make-up of the pin member with the box member, interference between at least one of the corresponding load flanks and the corresponding stab flanks occurs sequentially on the first step, the mid-step, and the second step.

9. A threaded connection having wedge threads, the threaded connection comprising:
   a pin member comprising a continuous pin thread having a pin thread crest, a pin thread root, a pin load flank, and a pin stab flank, wherein the continuous pin thread comprises at least a first step, a mid-step, and a second step formed sequentially thereon;

a box member comprising a continuous box thread having a box thread crest, a box thread root, a box load flank, and a box stab flank, wherein the continuous box thread comprises at least a first step, a mid-step, and a second step formed sequentially thereon, the steps on the continuous box thread corresponding generally in axial position with the steps on the continuous pin thread, wherein the first step has a first wedge ratio, the mid-step has a transition wedge ratio, and the second step has a second wedge ratio, wherein thread leads are substantially constant within each of the steps, wherein the connection is designed such that at make-up of the pin member with the box member, a clearance exists between both the corresponding load flanks and the corresponding stab flanks on at least one of the first step, the mid-step, and the second step.

10. The threaded connection of claim 9, wherein a beginning of the mid-step on the continuous pin thread is offset in axial position from a beginning of the mid-step on the box thread.

11. The threaded connection of claim 9, wherein a selected clearance exists between both the corresponding load flanks and the corresponding stab flanks on the mid-step.

12. The threaded connection of claim 9, wherein a selected clearance exists between both the corresponding load flanks and the corresponding stab flanks on both the first step and the second step.

13. The threaded connection of claim 9, wherein one of the first wedge ratio and the second wedge ratio is greater than the other.

14. The threaded connection of claim 9, wherein the first wedge ratio and the second wedge ratio are substantially equal.

15. The threaded connection of claim 9, wherein one of the continuous pin thread and the continuous box thread has a greater height on one of the first step, the mid-step, and the second step.

16. The threaded connection of claim 9, wherein during make-up of the pin member with the box member, interference between at least one of the corresponding load flanks and the corresponding stab flanks occurs sequentially on the first step, the mid-step, and the second step.

* * * * *